US006262225B1

(12) United States Patent
Patil et al.

(10) Patent No.: US 6,262,225 B1
(45) Date of Patent: Jul. 17, 2001

(54) CARBON MONOXIDE CONTAINING POLYMERS DERIVED FROM SYNTHESIS GAS (KWP-0002)

(75) Inventors: Abhimanyu O. Patil, Westfield; Manika Varma-Nair, Warren, both of NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/618,184

(22) Filed: Jul. 18, 2000

(51) Int. Cl.$^7$ ................................ C08G 67/02; C08F 2/00
(52) U.S. Cl. ............................ 528/392; 526/89; 526/227; 526/228; 526/230; 526/232.1; 526/303.1; 526/307.8; 526/341; 526/344; 524/717; 524/726
(58) Field of Search ................................ 528/392; 526/89, 526/227, 228, 230, 232.1, 303.1, 307.8, 341, 344; 524/717, 726

(56) References Cited

U.S. PATENT DOCUMENTS

| 3,156,774 | 11/1964 | Boudouris . | |
|---|---|---|---|
| 3,780,140 | 12/1973 | Hammer | 260/884 |
| 4,024,325 | 5/1977 | Hudgin | 526/11.1 |
| 4,024,326 | 5/1977 | Hudgin | 526/11.1 |
| 4,496,628 | 1/1985 | Deatcher et al. | 428/337 |
| 5,109,047 | 4/1992 | Aaronson et al. | 524/357 |
| 5,189,192 | 2/1993 | LaPointe et al. | 556/11 |
| 5,225,523 | 7/1993 | Drent et al. | 528/392 |
| 5,610,236 | 3/1997 | Bonner | 525/185 |

FOREIGN PATENT DOCUMENTS

| 2433722 | 1/1976 | (DE) . |
| 0590942B1 | 2/1999 | (EP) . |
| 1394590 | 8/1972 | (GB) . |
| WO 87/04174 | 7/1987 | (WO) . |
| WO 93/18108 | 9/1993 | (WO) . |
| WO 99/54277 | 10/1999 | (WO) . |

OTHER PUBLICATIONS

U.S. Application, Mahr, 917,012, Aug. 1973 (Abstract).

*Primary Examiner*—Samuel A. Acquah
(74) *Attorney, Agent, or Firm*—Kenneth W. Peist; Estelle C. Bakun

(57) ABSTRACT

The invention is related to an olefin-carbon monoxide-vinyl monomer terpolymer composition which is derived from an olefin feed and a synthesis gas feed and at least one vinyl monomer feed. The invention is also related to a method for preparing olefin-carbon monoxide-vinyl monomer terpolymers by heating an olefin feed, a synthesis gas feed and at least one vinyl monomer feed in the presence of a free radical polymerization initiator. More particularly, the synthesis gas feed comprises predominantly carbon monoxide and hydrogen. The terpolymers of the invention are useful as polyvinyl chloride plasticizers.

12 Claims, No Drawings

CARBON MONOXIDE CONTAINING POLYMERS DERIVED FROM SYNTHESIS GAS (KWP-0002)

FIELD OF THE INVENTION

The invention is directed towards terpolymers of olefin, carbon monoxide and at least one vinyl monomer wherein the carbon monoxide is derived from synthesis gas. The invention also encompasses a method for producing the olefin-carbon monoxide-vinyl monomer polymers using free radical polymerization.

BACKGROUND

Terpolymers of ethylene-carbon monoxide-X ("E—CO—X"), where X is third monomer such as vinyl acetate or methyl methacrylate are generally made from pure ethylene, carbon monoxide ("CO"), and vinyl acetate or methyl methacrylate feeds. These polymers are prepared using free radical initiators at high pressures and temperatures. Furthermore, these polymers are random which are generally difficult to make using organometallic catalysts. The E—CO—X terpolymers formed from free radical polymerization are useful as PVC modifiers and degradable films. Unfortunately, using pure feeds to produce these polymers increases the cost, which can make production too costly.

Synthesis gas feeds which contain carbon monoxide and hydrogen are formed by various gas conversion processes, and are quite abundant. Such feeds are often used for producing chemicals but are not considered for polymerization because of insufficient purity.

Thus, there is a need for providing a low cost method to produce olefin-CO-vinyl monomer terpolymers.

SUMMARY OF INVENTION

The instant invention provides olefin-CO-vinyl monomer terpolymers which are derived from an olefin feed, a synthesis gas feed and at least one vinyl monomer feed. These terpolymers may be used as effective plasticizers in polyvinyl chloride compositions.

In one embodiment, the invention is a composition comprising an olefin-carbon monoxide-X terpolymer wherein carbon monoxide is incorporated via a synthesis gas feed and X is at least one vinyl monomer.

In another embodiment, the invention is a polymerization method comprising reacting an olefin feed, a synthesis gas feed and at least one vinyl monomer feed under free radical polymerization conditions to form an olefin-carbon monoxide-X terpolymer wherein X is at least one vinyl monomer.

These and other features, aspects and advantages of the present invention will become better understood with regard to the following description and appended claims.

DETAILED DESCRIPTION OF THE INVENTION

The invention relates to a composition comprising a terpolymer of olefin, CO and at least one vinyl monomer wherein the CO is derived from synthesis gas. It should be appreciated by those skilled in the art that the term "terpolymer" is used herein as meaning a macromolecure formed from at least three monomer sources. Similarly, the term "copolymer" is used herein according to its broad meaning of a macromolecule formed from two or more monomer sources. Also, the term "polymer" is used herein according to its broad meaning of a macromolecule formed from at least one monomer source. The term "synthesis gas" (a.k.a., "syngas") refers to a gas mixture comprising predominantly of CO and hydrogen in various proportions and may contain other components in lesser quantities.

More specifically, syngas can be made by many processes, the most common being partial oxidation and steam reforming. Feedstocks can vary from coal (in which case the partial oxidation process is often referred to as "gasification") to natural gas. Combinations of partial oxidation and steam reforming, for example autothermal reforming, are often used to optimize the cost of producing a syngas of specific composition. The specific composition of the syngas from these conversion technologies will be influenced by temperature, pressure, and concentrations of co-reactants, including steam and $CO_2$. The watergas shift reaction is often used to adjust the $H_2/CO$ ratio of the syngas composition. Separation technologies are also used to adjust syngas composition, and syngas compositions can be varied in an infinite manner by the combination of these reaction and separation technologies. Lowest cost syngas is usually made by application of the fewest process steps, such that syngas ratios between $H_2/CO$ of 0.5 and 3 are usually most economical to produce. These processes and combinations, as well as the major components that are present in the resulting syngas, are well known in the art. In the present invention, the ratio of $H_2/CO$ is between 10:90 and 90:10. More preferably, the ratio of $H_2/CO$ is between 25:75 and 75:25. Most preferably, the ratio of $H_2/CO$ is between 40:60 and 60:40.

In one embodiment, the invention is a composition comprising an olefin-CO-vinyl monomer terpolymer derived from an olefin feed, a synthesis gas feed and at least one vinyl monomer feed. The olefins (i.e., olefinically unsaturated compounds) useful in the invention typically contain up to about 20 carbon atoms and preferably up to 10 carbon atoms. They may contain heteroatoms; however, it is preferred that the olefinically unsaturated compounds are hydrocarbons. A preferred class of olefinically unsaturated hydrocarbons are aliphatic mono-olefins, in particular α-olefins of which ethylene is particularly preferred for one of the olefin feeds. As for the other olefin feed(s), the following are preferred: 1-butene, propylene, styrene, vinyl acetate, and acrylates. Of these 1-butene and propylene are particularly preferred.

The vinyl monomer feed may contain at least one free radical-polymerizable vinyl comonomer, or a cofeed containing such a comonomer can be used. Vinyl monomers useful in the invention include α-olefins (preferably $C_3$ to $C_{30}$ olefins) such as propylene, butene, 1-octene, 1-octadecene, styrene and styrene derivatives such as α-methylstyrene, p-methylstyrene, tetrafloroethylene, vinyl chloride, vinyl acetate, isobutyl vinyl ether, methyl vinyl ketone, 1-vinylpyrrolidone, acrylic acid, methacrylic acid, methylacrylate, methylmethacrylate, acrylonitrile, acrylamide, acrolein, allyl alcohol, allyl chloride, allyl acetate, mixtures thereof and similar materials. While the vinyl monomer concentration in the feed may range from zero or trace amounts to about 95 mole %, the preferred concentration ranges from about 5 mole % to 80 mole %.

The number average molecular weight ("Mn") of the copolymers formed in accordance with the invention can range from about 100 to about 1,000,000 with a preferred range from about 200 to 100,000. In a preferred embodiment, the polymer of the invention comprises 40–90 mole % ethylene, 3–40 mole % carbon monoxide, and 5–60 mole % vinyl monomer.

The ratio of the number of monomer units originating in the olefins to the number of carbon atoms originating in carbon monoxide is preferably at most about 99:1 and more preferably in the range of from about 90:1 to about 1:1, and still more preferably from about 95:1 to about 1:1.

In another embodiment, the invention provides a polymerization method for reacting an olefin feed, a synthesis gas feed and at least one vinyl monomer feed under free radical copolymerization conditions to produce the olefin-CO-vinyl monomer terpolymer composition described above. The free radical polymerization process uses organic peroxides as a free radical initiator according to conventional methods well known to those skilled in the art. Representative initiators include, but are not limited to, dialkyl peroxides such as ditertiary-butyl peroxide, 2,5-dimethyl-2,5-ditertiary-butyl-peroxyhexane, di-cumyl peroxide; alkyl peroxides such as tertiary-butyl hydroperoxide, tertiary-octyl hydroperoxide, cumene hydroperoxide; aroyl peroxides such as benzoyl peroxide; peroxy esters such as tertiary-butyl peroxypivalate, tertiary-butyl-perbenzoate; and compounds such as azo-bis-isobutyronitrile. Free radical initiators with an appropriate half life at reaction temperatures ranging from about 50° C. to about 230° C. can be used. Of these, t-butyl peroxypivalate, which has a half life of about 10 hours at 66° C., is preferred.

Typically copolymerization will occur at temperatures ranging from about 50 to about 230° C. and preferably from about 50° C. to about 200° C. Pressures can range from about 100 to about 30,000 psig and preferably from about 100 psig to about 3,000 psig. Of course, the polymerization is accomplished in the presence of a free radical initiator having an appropriate half life.

Preferably, the reaction occurs in the presence of a solvent. Suitable solvents include toluene, benzene, dioxane, pentane, heptane, hexane, propylene oxide, cyclohexane, supercritical carbon dioxide, and the like. Hexane is preferred.

The terpolymers prepared in accordance with this invention may be recovered using conventional methods. For example, filtration or evaporation of the diluent may be used. Further, the terpolymers may be brought into the desired shape using standard forming techniques, such as cold or hot pressing. Alternatively, the polymerization is carried out in such a way that the terpolymer is formed in the desired shape, such as by solution polymerization in a thin layer and subsequent removal of the diluent, which yields the terpolymer in the form of a film.

The invention is further described in the following non-limiting examples.

EXAMPLES

Example 1

Synthesis of ethylene-CO-alpha-olefin terpolymers using syngas

A 300-mL autoclave engineer's reactor was charged with 150 mL pure n-hexane and 0.64 g of a 75% solution of t-butyl peroxypivalate in mineral spirits. The reactor was sealed and purged with purified nitrogen. The reactor was then pressurized with ethylene and syngas mixture (ethylene:carbon monoxide:hydrogen 70:15:15, respectively). Then 10.8 g of 1-butene was added, the temperature was raised to 66° C. while stirring, and the pressure was maintained for 24 hours. The reactor was allowed to cool to room temperature and then depressurized. The hexane was removed on a rotary evaporator, leaving 4.9 g of the product.

The IR spectrum of the product shows a very strong peak at 1711 $cm^{-1}$ due to the carbonyl group. Thus, CO has been incorporated in the product. The NMR of the product suggests that the polymer has 25.8% CO incorporation. The NMR spectrum of the terpolymer suggested that it has 134.9 branches per 1000 carbons versus 65.5 branches per 1000 carbons for the control experiment (see Example 2 below) without 1-butene termonomer. This observation indicates that increased in branching may result from alpha-olefin incorporation in the polymer. The GPC of the product indicates a Mn of 1000 and Mw of 2000 (polystyrene standards, THF solvent).

Example 2

Control Experiment—Synthesis of ethylene-CO copolymers without 1-butene

A 300-mL autoclave engineer's reactor was charged with 150 mL pure n-hexane and 0.64 g of a 75% solution of t-butyl peroxypivalate in mineral spirits. The reactor was sealed and purged with purified nitrogen. The reactor was then pressurized with an ethylene and syngas mixture (ethylene:carbon monoxide:hydrogen 70:15:15, respectively). The temperature was raised to 66° C. while stirring, and the pressure was maintained for 24 hours. The reactor was allowed to cool to room temperature and then depressurized. The hexane was removed on a rotary evaporator leaving 9.3 g of product.

The IR spectrum of the product shows a very strong peak at 1709 $cm^{-1}$ due to the carbonyl group. Thus, CO has been incorporated in the product. The NMR of the product suggests that the polymer has 33.9% CO incorporation. The NMR spectrum of the terpolymer suggested that it has 65.5 branches per 1000 carbons. The GPC of the product indicates a Mn of 1600 and Mw of 3200 (polystyrene standards, THF solvent).

Example 3

Synthesis of ethylene-CO-alpha-olefin terpolymers using syngas

A 300-mL autoclave engineer's reactor was charged with 150 mL pure n-hexane and 0.64 g of a 75% solution of t-butyl peroxypivalate in mineral spirits. The reactor was sealed and purged with purified nitrogen. The reactor was then pressurized with an ethylene and syngas mixture (ethylene:carbon monoxide:hydrogen 70:15:15, respectively). Then 5.9 g of 1-butene was added, the temperature was raised to 66° C. while stirring, and the pressure was maintained for 24 hours. The reactor was allowed to cool to room temperature and then depressurized. The hexane was removed on a rotary evaporator leaving 7.0 g of the product The IR spectrum of the product showed a very strong peak at 1711 $cm^{-1}$ due to the carbonyl group. Thus, CO has been incorporated in the product. The NMR of the product suggested that the polymer had 29.6% CO incorporation. The NMR spectrum of the terpolymer suggested that it has 101 branches per 1000 carbons versus 65.5 branches per 1000 carbons obtained in a control experiment without the 1-butene termonomer. This observation indicates that increased branching may result from alpha-olefin incorporation in the polymer. The GPC of the product indicates a Mn of 500 and Mw of 1000 (polystyrene standards, THF solvent).

Example 4

Synthesis of ethylene-CO-alpha-olefin terpolymers using syngas

A 300-mL autoclave engineer's reactor was charged with 150 mL pure n-hexane and 0.64 g of a 75% solution of t-butyl peroxypivalate in mineral spirits. The reactor was sealed and purged with purified nitrogen. The reactor was then pressurized with an ethylene and syngas mixture (ethylene:carbon monoxide:hydrogen 70:15:15, respectively). Then 5.9 g of propylene was added, the temperature was raised to 66° C. while stirring, and the pressure was maintained for 24 hours. The reactor was allowed to cool to room temperature and was then depressurized. The hexane was removed on a rotary evaporator, leaving 7.6 g of the product.

The IR spectrum of the product showed a very strong peak at 1711 $cm^{-1}$ due to the carbonyl group. Thus, CO has been incorporated in the product. The NMR of the product suggested that the polymer had 17.5% CO incorporation. The NMR spectrum of the terpolymer suggested that it has 72.8 branches per 1000 carbons versus 65.5 branches per 1000 carbons obtained in a control experiment without the propylene termonomer. This observation indicates that increased branching may result from alpha-olefin incorporation in the polymer. The GPC of the product indicated a Mn of 500 and Mw of 1000 (polystyrene standards, THF solvent).

Example 5

Synthesis of ethylene-CO-alpha-olefin terpolymers using syngas

A 300-mL autoclave engineer's reactor was charged with 150 mL pure n-hexane and 0.64 g of a 75% solution of t-butyl peroxypivalate in mineral spirits. The reactor was sealed and purged with purified nitrogen. The reactor was then pressurized with an ethylene and syngas (ethylene:carbon monoxide:hydrogen 70:15:15, respectively) mixture. Then 10.8 g of 2-butene was added, the temperature was raised to 66° C. while stirring, and the pressure was maintained for 24 hours. The reactor was allowed to cool to room temperature and then depressurized. The hexane was removed on a rotary evaporator, leaving 6.7 g of the product.

The IR spectrum of the product showed a very strong peak at 1711 $cm^{-1}$ due to the carbonyl group. Thus, CO has been incorporated in the product. The NMR of the product suggested that the polymer had 18.2% CO incorporation. The NMR spectrum of the terpolymer suggested that it has 93.2 branches per 1000 carbons versus 65.5 branches per 1000 carbons obtained in a control experiment without 2-butene termonomer. This observation indicates that increased branching may result from alpha-olefin incorporation in the polymer. The GPC of the product indicated a Mn of 590 and Mw of 1120 (polystyrene standards, THF solvent).

The above examples clearly show that olefin-CO-alpha olefin terpolymers can be formed using a syngas feed.

What is claimed is:

1. A composition comprising an olefin-carbon monoxide-X terpolymer wherein carbon monoxide is incorporated via a synthesis gas feed and X is at least one vinyl monomer.

2. The composition of claim 1 wherein said terpolymer's number average molecular weight ranges from about 200 to about 100,000.

3. The composition of claim 1 wherein said olefin is ethylene.

4. The composition of claim 1 wherein X is selected from the group consisting of $C_3$ to $C_{30}$ alpha-olefins, styrene, styrene derivatives, tetraflorothylene, vinyl chloride, vinyl acetate, isobutyl vinyl ether, methyl vinyl ketone, 1-vinylpyrrolidone, acrylic acid, methacrylic acid, methylacrylate, methylethacrylate, acrylonitrile, acrylamide, acrolein, allyl alcohol, allyl chloride, allyl acetate, and mixtures thereof.

5. The composition of claim 1 wherein the composition comprises 40–90 mole % ethylene, 3–40 mole % carbon monoxide, and 5–60 mole % vinyl monomer.

6. A polymerization method comprising reacting an olefin feed, a synthesis gas feed and at least one vinyl monomer feed under free radical polymerization conditions to form an olefin-carbon monoxide-X terpolymer wherein X is at least one vinyl monomer.

7. The method of claim 6 wherein the polymerization conditions range in temperature from about 50 to about 230° C. and range in pressure from about 100 to about 30,000 psig.

8. The method of claim 6 wherein the polymerization is conducted in the presence of a solvent selected from the group consisting of toluene, benzene, dioxane, pentane, heptane, hexane, propylene oxide, cyclohexane, supercritical carbon dioxide, and mixtures thereof.

9. The method of claim 6 wherein the method employs a free radical initiator selected from the group consisting of ditertiary-butyl peroxide, 2,5-dimethyl-2,5-ditertiary-butyl-peroxyhexane, di-cumyl peroxide; teriary-butyl hydroperoxide, tertiary-octyl hydroperoxide, cumene hydroperoxide; benzoyl peroxide; tertiary-butyl peroxypivalate, tertiary-butyl-perbenzoate; azo-bis-isobutyronitrile and mixtures thereof.

10. The method of claim 6 wherein said olefin feed is ethylene.

11. The method of claim 6 wherein X is selected from the group consisting of $C_3$ to $C_{30}$ alpha-olefins, styrene, styrene derivatives, tetrafloroethylene, vinyl chloride, vinyl acetate, isobutyl vinyl ether, methyl vinyl ketone, 1-vinylpyrrolidone, acrylic acid, methacrylic acid, methylacrylate, methylmethacrylate, acrylonitrile, acrylamide, acrolein, allyl alcohol, allyl chloride, allyl acetate, and mixtures thereof.

12. The product formed by the method of claim 6.

* * * * *